J. Muir,
Making Pottery.

Nº 45,736.      Patented Jan. 3, 1865.

Witnesses:
F. C. Treadwell Jun.
Guernsey Jackett

Inventor:
Joseph Muir

UNITED STATES PATENT OFFICE.

JOSEPH MUIR, OF NEW YORK, N. Y.

MACHINE FOR CONDENSING PAP OR SLOPS OF CLAY FOR POTTERS' USE.

Specification forming part of Letters Patent No. 45,736, dated January 3, 1865.

*To all whom it may concern:*

Be it known that I, JOSEPH MUIR, of the city, county, and State of New York, have invented a certain new and useful Machine for Condensing the Pap or Slops of Clay for Potters' Use; and I hereby declare that the following is a full and correct description thereof, reference being had to the annexed drawings, making part of this specification, of which—

Figure 1:
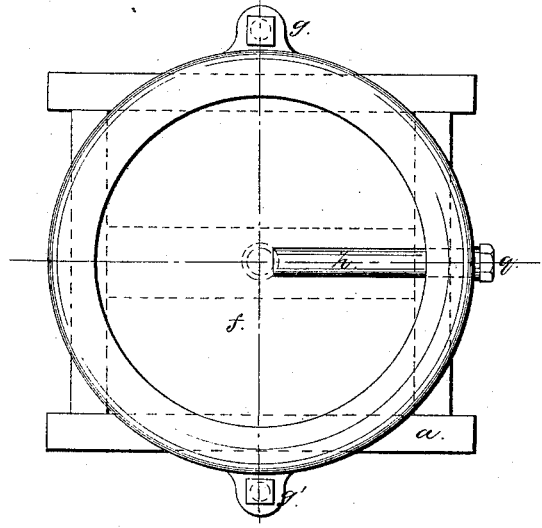
Figure 3:
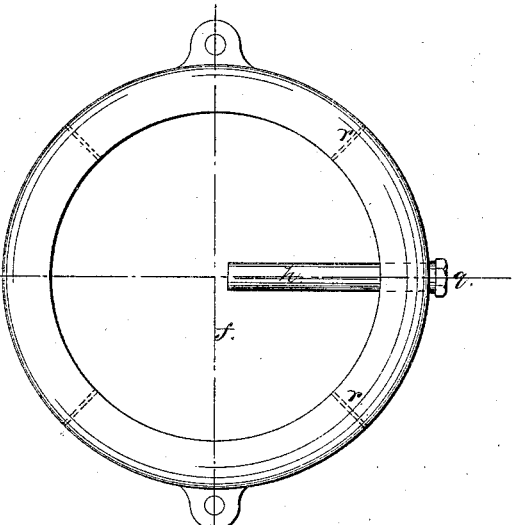
Figure 2:
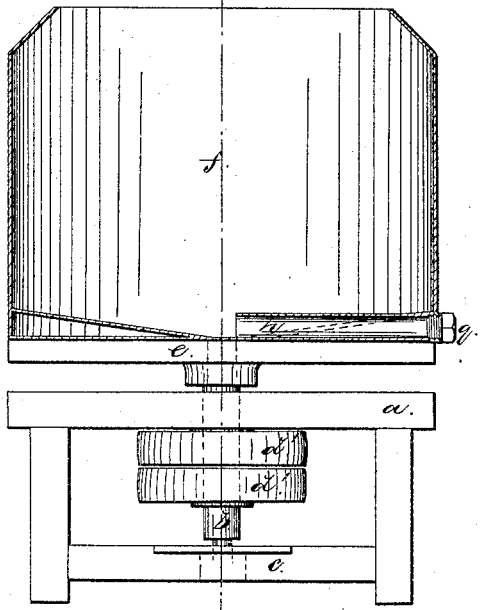
Figure 4:
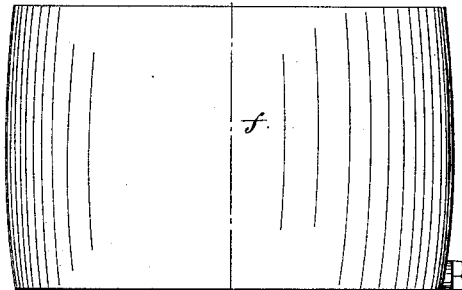
Figure 5:
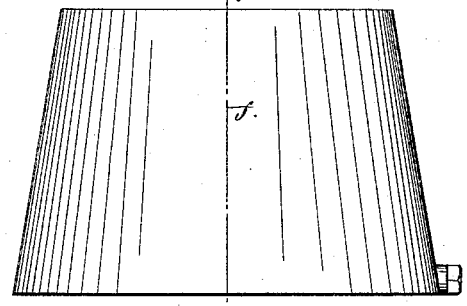

Figure 1 is a plane view of the machine; Fig. 2, a sectional elevation. Figs. 3, 4, and 5 represent modifications of parts of the machine.

My said machine consists of a whirling-vessel combined with mechanism for rotating it, the whirling-vessel being of circular form, for condensing the pap or slops of clay for potters' use when the same is placed therein in proper quantities and subjected to its operation, substantially as hereinafter described, but more particularly to describe said machine, I will refer to the drawings by letters of reference.

Letter $a$ represents the frame; letter $b$, a vertical shaft stepped in a cross-bar, $c$, at the bottom of the frame, and provided with tight and loose pulleys, $d$ and $d'$. The upper part of the shaft runs in a bearing fitted to it, and carries a horizontal disk or platform, $e$. Upon this platform is the whirling-vessel, $f$, secured to the platform by screw-bolts $g$ and $g'$, or in any other convenient manner. A pipe, $h$, leads from the center of the vessel, at the bottom, outward to its periphery, and is closed at the end by the screw plug $q$, or in any other convenient manner. This pipe may be dispensed with, and in its place a hole may be made in the center of the vessel, communicating with a hole in the shaft, or a pump or siphon may be used to draw off the water. At the top of the vessel the sides tumble or incline inward, to prevent the material from being thrown out of the vessel and to confine it to the sides thereof. The sides of the whirling-vessel should be imperforate and impermeable to water, in order to prevent the escape thereof through the sides during the operation of the machine.

At Fig. 3 of the drawings, wings $r$ are shown by dotted lines, which may be attached to the sides. There are also shown, at Figs. 4 and 5, different forms of whirling-vessels which I have used to advantage, but I prefer the forms shown at Figs. 1 and 2.

My said machine is designed to be used in carrying out an improvement in the process of preparing clay for potters' use. In operating the machine for this purpose the slops or pap is placed in the whirling-vessel until it is about one third full. The vessel is then set in rapid motion by the rotating mechanism, and the centrifugal force communicated to the mixture throws it out from the middle of the vessel and against the sides thereof, to which the clay adheres by reason of its adhesiveness, the water falling back to the middle of the vessel when the motion is stopped, from whence it may be removed in any of the ways before mentioned, and the clay may then be taken from the vessel in the plastic state to be used by the potter, or it may be solidified by evaporation and prepared for market as potters' clay, in the usual manner.

It is necessary that the sides of the whirling-vessel should incline inward at or toward the top, or, if the sides be perpendicular, that they should have a rim at the top projecting inward, for the purpose of preventing the materials from being thrown out.

I claim—

1. The whirling-vessel having imperforated sides, impermeable to water, and inclining inward or with a rim at the top, and combined with mechanism for rotating it, substantially as described and substantially for the purposes hereinbefore set forth, and with the draw-off pipe $h$, or its equivalent, in combination with the whirling-chamber.

2. Securing the whirling-vessel to the rotating mechanism by means of a disk or platform, $e$, and the screw-bolts $g$ and $g'$, or their equivalents, for the purpose of conveniently attaching or removing the whirling-vessel.

JOSEPH MUIR.

Witnesses:
F. C. TREADWELL, JR.,
GUERNSEY SACKETT.